No. 861,079. PATENTED JULY 23, 1907.
L. D. BENNER.
CORN PLANTER.
APPLICATION FILED FEB. 17, 1905.
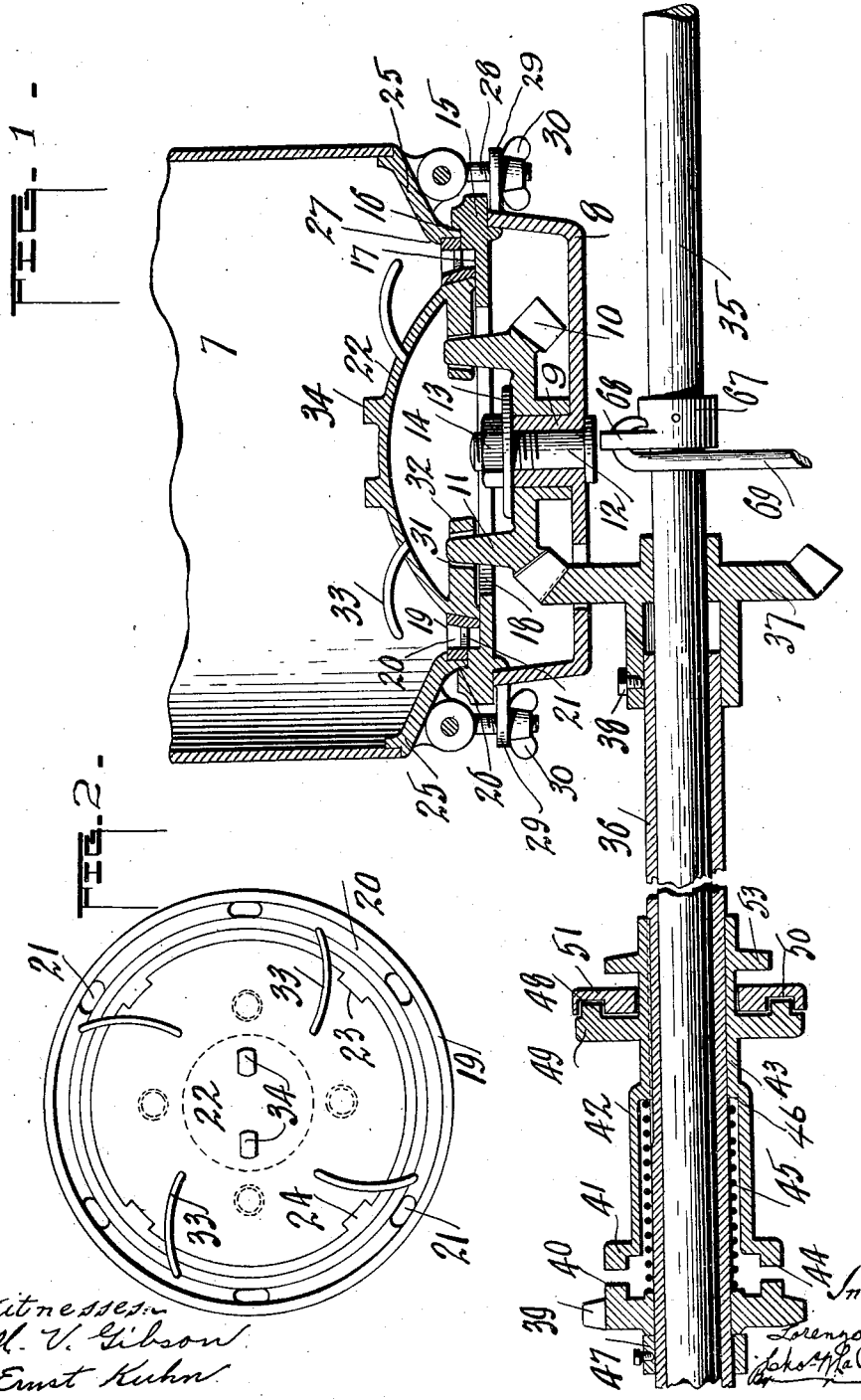

UNITED STATES PATENT OFFICE.

LORENZO D. BENNER, OF PEORIA, ILLINOIS.

CORN-PLANTER.

No. 861,079.  Specification of Letters Patent.  Patented July 23, 1907.

Application filed February 17, 1905. Serial No. 246,020.

*To all whom it may concern:*

Be it known that I, LORENZO D. BENNER, a citizen of the United States, residing at Peoria, in the county of Peoria and State of Illinois, have invented certain new and useful Improvements in Corn-Planters; and I do hereby declare that the following is a full, clear, and exact description of the invention, which will enable others skilled in the art to which it appertains to make and use the same.

This invention has reference to seed planting machines, and relates particularly to corn planters, although the same may be used equally as well for planting different kinds of seeds.

The object of the invention is a base-plate; a seed dropping ring revolubly mounted on said base-plate; a cap-plate which also serves as a center driving ring of the seed plate and detachably attached to the seed dropping ring aforesaid, and means for driving the cap-plate and thereby impart rotation to the said seed dropping ring.

For a full description of the invention herein and the merits thereof and also to acquire a knowledge of the details of construction of the means for effecting the result, reference is to be had to the following description and drawings hereto attached.

While the essential and characteristic features of the invention are susceptible of modification, still the preferred embodiment of the invention is illustrated in the accompanying drawings, in which:—

Figure 1 is a vertical sectional view through a hopper and the seeding mechanism therein; also showing a rock shaft and a sleeve, and clutch mechanism carried thereby, by means of which rotation may be imparted to the seeding mechanism in the hopper; Fig. 2 is a top plan view of the seeding plate, as a whole, consisting of an outer ring provided with seed cells and an inner ring or cap-plate detachably attached to the ring;

Like numerals of reference indicate corresponding parts throughout the figures.

In the drawings, a seed-box or hopper which is placed at or near one end of a runner frame, comprises the upper hopper portion 7 and the lower false bottom 8. The false bottom is adapted to be attached or secured to a suitable seed tube or shank (not shown) which in turn would be supported on the runner or forward frame of the planter in the ordinary way. The false bottom 8, shown in Fig. 1 is provided with the hollow or tubular stem 9 extending upwardly from the center of the same, and rotatable on the stem 9 is a bevel-gear wheel 10, provided with the upwardly extended studs or stems 11. The gear 10 is retained in position on the stem 9 by means of a bolt 12 passing up through the stem 9 and a washer 13 disposed at the head of the stem and overlapping the hub of the gear, and secured to the upper end of the bolt by a nut 14. The false bottom 8 supports a base plate 15 provided with the annular depressions 16 and 17, one within the other and the central annular opening 18, for a purpose to be described. The plate 15 is held in engagement with the side walls of the bottom 8 by the lips 16. Revolubly mounted on the plate 15 is a ring 19, being one part of a seed dropping plate, and is provided with the annular groove 20 in which is arranged a series of seed cells 21. The outer flange of this ring is movable on the base of the depression 16, while its inner flange is movable on the base of the depression 17. The other part of the plate, consists of a dome shaped cap-plate or portion 22 having a peripheral edge conforming to the face of the inner flange of the ring 19 and is detachably secured thereto, by being provided with the cut-out portions 23 in which are seated the lugs or projections 24 of the ring.

To retain the base plate, also the seed plate, in their relative working positions, I have provided the base-ring 25 of the hopper portion 7, the lower edge of which rests on the base of the depression 16 intermediate a flange portion 26 formed by the depression 16 and the outer peripheral face of the ring 19; and 27 is an overlying ledge of the ring 25 which is adapted to engage the outer flange of the ring 19 of the seed plate. The manner of securing the hopper portion 7 to the ring 25 is best seen in Fig. 1. The ring 25 is in turn locked to the false bottom 8 by the bolts 28 pivoted to the ring 25 adapted to engage the lugs 29 of the false bottom and so retained by means of the thumb nuts 30.

The driving connections between the gear 10 and the cap-plate portion 22 of the seed plate is through the lugs 11 of the said gear, which project upwardly through the opening 18 in the base plate and engage perforations 31 of an inner projected flange or ring 32 of the plate 22, as shown in Fig. 1. Thus through the connections shown, any motion which is imparted to gear 10 will be transmitted to the plate 22 and from the same to the ring 19, as before explained. By making the plate in two sections provision is made for interchangeable ring sections made with various size seed cells and more or less in number as may be desired; thus simplifying the construction of the plates and reducing the cost of a series of plates down to a minimum, as well as reducing the weight of the same. One advantage of the center driving plate portion which is also a cap-plate is that the same may be provided with a series of stirrers 33, in this instance spring arms extending in oblique lines radially from the center of the said plate, while serving to agitate the seed, will also tear apart any gummy substance in which the seed may be contained, especially, if the planter be employed in cotton planting. The plate 22 is further provided with the short studs 34 which are disposed approximately central of the plate and serve as agitators in addition to the arms or fingers 33, described.

For imparting power to the gear wheel 10, in the seed box, any suitable means may be employed, but I have shown a rock-shaft 35 on which is revolubly and loosely carried a sleeve shaft 36. This sleeve shaft has adjustably secured thereto the bevel gear wheel 37 adapted to be in continuous mesh with the gears 10 in the hopper bottom, the said gear being retained on the sleeve shaft by means of the adjusting screws 38. 39 denotes a sprocket pinion loosely carried on the sleeve shaft 36 approximately central thereof and is provided with the ratchet teeth 40 on one of its faces forming one of two clutch members; the other member or coacting clutch part is indicated as 41 being a flange of an enlarged sleeve portion 42 which is also an extension of a reduced sleeve part feathered on the sleeve shaft 36, the said flange provided with one or more teeth 44 adapted to have an intermittent engagement with the teeth 40 of the sprocket pinion 39 above described. The sleeve 43 is normally held with the teeth 44 of the flange 41 disengaged from the teeth 40 of the sprocket pinion 39 above described. The sleeve 43 is normally held with the teeth 44 of the flange 41 disengaged from the teeth 40 of the sprocket pinion by means of a coil spring 45 encircling the sleeve shaft 36 within the enlarged sleeve extension 42, one end bearing against the sprocket pinion and its opposite ends bearing against a shoulder 46 of the sleeve part 43; the sprocket is held against end thrust by means of a collar 47 on the sleeve shaft. The sleeve 43 being in normal position described, the lugs 48 of a disk 49 integral with or attached to the sleeve 43 engage and have a locked relation with slots, depressions or cut-out portions 50 of a ring or plate 51 adapted to be supported in any suitable manner on the runner or supporting frame, not shown.

To cause an engagement of the teeth 44 with the teeth 40 of the sprocket pinion, suitable means may be employed between the rock-shaft and the sleeve 43, whereby when the rock-shaft is actuated by a tappet wire, hand or foot power, the sleeve 43 and its component parts will be shoved towards the pinion 39 and their clutch faces engage, when for a predetermined period the sleeve shaft 36 will be partially rotated, imparting a desired movement to the gears 37 and 10, and the seed plate connected therewith. Such means, it is preferred shall contain a disk 53 attached to or forming a part of the sleeve 43, which may be operated in some suitable manner for shifting the disk 53, the sleeve 43 and its parts towards the pinion 39, resulting in a disengagement of the lugs 48 of the disk 49 from the ring or plate 51, and causing the teeth 44 to lock with the teeth 40 of the pinion 39; the latter being continuously rotated becomes fast with the sleeve 43 and it being feathered on sleeve 36 transmits motion thereto and to the gears 37, and from these to the plates through the gears 10, in the manner specified. It is intended in the structure here shown to impart only a one half revolution to the seed plates, therefore there are only two cut-out portions or depressions 50 in the ring 51, and in the rotation of the sleeve 43 when the lugs 48 coincide with the depressions 50 of the plate 51 the spring 45 which has been compressed in the locking of the clutch parts is released and forces the lugs 48 into the said depressions, releasing the clutch parts locking the sleeve 43 and the sleeve shaft 36 against rotation, as will be understood. Should it be desired to stop the shaft at a quarter turn there would be four of the lugs 48 and correspondingly that number of depressions 50 in the ring 51, or the construction modified in accordance with the rotation desired to be imparted to the seed plate. To insure the positive locking of the lugs 48 in the depressions 50 of the ring 51, the face of the latter between its depressions may be tapered, placing the wall of one side of the depressions a little higher than its opposite side, and thus when the lugs 48 would ride into the depressions they would engage with such raised portions and insure their being locked in the ring 51. While I have shown and described the disk 49 as being provided with the lugs 48, it is to be noted that I contemplate the substitution of rollers, which would work equally as well if not better than the lugs, as described.

On the shaft 35 at a point which would be in the shank or seed tube, where shown, is attached a collar 67 provided with an ear 68 and to the ear is attached the upper end of a rod 69 adapted to have connection with suitable valve mechanism, not shown. An advantage of a sleeve shaft in a planter of this kind is, that it places the rock shaft directly under the plate, thus connections from the said shaft to valves in the shanks may be the more easily made.

It is obvious from the foregoing, that various changes may be made in the construction and application of the within devices and I do not wish to be confined to the exact details of construction shown and described.

Having thus fully described my invention, what I claim and desire to secure by Letters Patent of the United States, is:—

1. In a corn planter, the combination of a seed plate comprising an annular ring having a series of seed cells, a center for the said ring adapted to have a detachable connection therewith, inwardly projected means from the center of the ring aforesaid, driving mechanism, and driving connections between said mechanism and the inwardly projected means of the center of said plate.

2. In a corn planter, the combination of a seed plate comprising an annular ring provided with an annular groove in which is arranged a series of seed cells, a center for the said ring adapted to have a detachable connection therewith, inwardly projected means from the center of the ring aforesaid, driving mechanism, and driving connections between said mechanism and the inwardly projected means of the center of said plate.

3. In a corn planter, the combination of a seed plate comprising an annular ring having a series of seed cells, a center for the said ring adapted to have a detachable connection therewith and dome-shaped to serve as a cap-plate, a gear having a detachable connection with the dome-shaped center plate, an intermittently actuated shaft, and gearing connecting said shaft with said first mentioned gear.

4. In a corn planter, the combination of a revoluble seed plate consisting of an inner and outer section detachably connected together, a driving gear provided with means adapted to have a detachable connection with means on said inner section of the plate, a driving gear in mesh with said first mentioned gear, and intermittently actuated means for imparting motion to said driving gear.

5. In a corn planter, the combination of a revoluble seed plate consisting of an inner and outer section, the said inner section being dome-shaped and provided with inwardly projected means adapted to have connection with suitable driving devices, the outer section arranged with a series of seed cells.

6. In a corn planter, the combination of a revoluble seed plate consisting of an inner and outer section detachably connected together, the outer section arranged with a series of seed cells, the inner section provided with an inwardly projected ring, a driving gear for said plate having upwardly extended lugs adapted to have a detachable connection with the inwardly projected ring of the inner section of said plate, and driving mechanism for actuating the said gear.

7. In a corn planter, the combination of a revoluble seed plate consisting of an inner and outer section, the outer section arranged with a series of seed cells, the inner section provided with a series of stirrers and an inwardly projecting ring, a driving gear for said plate having upwardly extended lugs adapted to have a detachable connection with the inwardly projected ring of the inner section of said plate, and driving mechanism for actuating the said gear.

8. In a corn planter, the combination of a base plate, a seed plate revolubly supported on the base plate and consisting of inner and outer detachable sections, the outer section provided with a series of seed cells, gearing adapted to have a detachable connection with said inner section of the plate, means for actuating said gearing, a hopper-supporting ring supported by the base plate and provided with means for locking the seed plate in working position on said base plate.

9. In a corn planter, the combination of a base plate having a central opening, a seed plate revolubly supported on the base plate and consisting of inner and outer detachable sections, the outer section provided with a series of seed cells, gearing for actuating the seed plate disposed beneath the base plate and provided with means projected through the opening in the base plate and having connection with the inner section of said seed plate, and a hopper-supporting ring supported by the base plate and provided with means for locking the seed plate in working position on the base plate.

10. In a corn planter, the combination of a false bottom, a base plate supported by said bottom and having a central opening, a seed plate revolubly supported on the base plate and consisting of inner and outer detachable sections, a gear revolubly supported in said false bottom and provided with means projected through the opening in the base plate and having connection with one of the sections of the seed plate, mechanism for actuating said gear, a hopper-supporting ring supported by the base plate and provided with means for locking the seed plate in working position on said base plate, and means for locking the hopper-supporting ring to said false bottom.

In testimony whereof I affix my signature, in presence of two witnesses.

LORENZO D. BENNER.

Witnesses:
H. V. GIBSON,
ROBERT N. MCCORMICK.